Nov. 25, 1969     J. H. ANDERSON     3,480,285

MECHANICAL SHAFT SEAL

Filed Dec. 12, 1967

INVENTOR
JAMES H. ANDERSON

BY

ATTORNEYS

United States Patent Office 3,480,285
Patented Nov. 25, 1969

3,480,285
MECHANICAL SHAFT SEAL
James H. Anderson, 1615 Hillock Lane,
York, Pa. 17403
Filed Dec. 12, 1967, Ser. No. 689,839
Int. Cl. F16j 15/36, 15/38
U.S. Cl. 277—88                                    5 Claims

ABSTRACT OF THE DISCLOSURE

A rotary mechanical seal apparatus having a pair of coacting members with adjacent rubbing faces to form a fluid tight seal. One of said members is usually mounted on or carried by a rotating element, such as a shaft, while the other member is retained against rotation within a suitable support, such as a housing. The housing supported member is biased into engagement with the rotating member so as to maintain the rubbing faces of the members in engagement and thereby effectively seal a fluid within the housing.

Background of the invention

The present invention pertains to an improvement in shaft seal construction for effectively sealing a fluid within a housing wherein a rotating shaft extends through the housing. As an illustration in point the present mechanical shaft seal could be utilized in connection with the driving shaft of a fluid pump and the pump housing. It is customary in shaft seals of the type under consideration to have one of the members rotating and the other non-rotating with the non-rotating member being spring biased into engagement with the rotating member. The rotating and non-rotating members have adjacent faces that are maintained in rubbing sealing engagement or contact with one another to provide an effective seal against the passage of fluid from a housing along a rotating shaft that extends from said housing.

The non-rotating member is usually spring biased into engagement with a rotating member to insure a relative tight seal between said members as the shaft is susceptible of moving in an axial direction in the housing. In an effort to insure against leakage between the housing and non-rotating member, and particularly when said member moves axially in conjunction with the shaft, suitable sealing means, such as O rings, have been employed between the housing and non-rotating member. While the O ring is capable of a slight sliding or rolling movement, with respect to the housing and non-rotating member, while still maintaining a tight seal said ring does tend to lose its effectiveness after repeated operations over a period of time. The conditions and usage to which the O ring might be subjected can very often bring about a change in the resilient and sealing characteristics of the ring so that the ring will tend to stick or adhere to the housing. Such a condition in and of itself will result in the non-rotating member hanging and not following or moving with the rotating member upon an axial movement of the shaft in the housing. This results in a separation of the sealing faces of the members and the consequent development of a large leakage of fluid from the housing.

Summary of the invention

The present invention is directed to the concept of using a bellows for connecting the non-rotating member to the housing. While the bellows may be formed from metal that has resilient and flexible characteristics the use of an elastomeric material would be preferable in the majority of instances. An elastomeric material would not have the tendency to break from fatigue and vibration, occasioned by high speed operation, as would a bellows formed from metal. In order to be certain that the bellows formed from elastomeric material does not collapse, as a result of a pressure build-up within the housing, a reinforcing member or members could be employed in association with the bellows member. Such an arrangement would preclude a radial collapsing of the bellows member and yet at the same time would still permit the bellows member to flex so as to effectively seal against the leakage of any fluid from the housing in the event of any axial movement of the non-rotating member with respect to such a movement by the rotating member and shaft.

Description of the preferred embodiments

Figure 1:
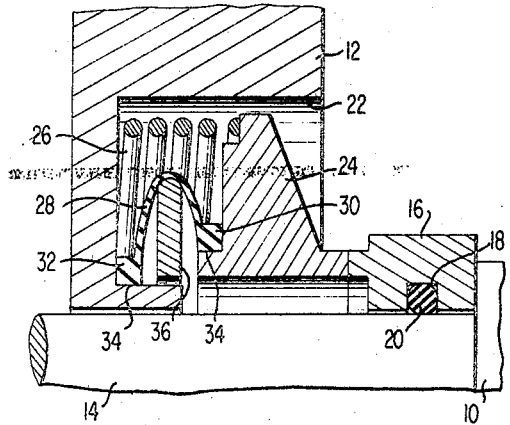
FIGURE 1 is a longitudinal sectional view through one-half of a rotary shaft seal embodying the present invention.

Referring to FIGURE 1 of the drawing there is shown a shaft 10, which for purposes of illustration may be regarded as the rotating drive shaft of a fluid pump, not shown, and which shaft projects through an opening in a housing 12. The shaft 10 may be formed with a reduced end portion 14 upon which is mounted a sealing member 16 that is preferably formed from a low friction material such as carbon. In lieu of a reduced end portion 14 the shaft may be of a uniform diameter throughout with the sealing member 16 positioned thereon. The sealing member 16 may be mounted upon or secured to the shaft 10 in any suitable manner so as to be capable of not only rotating but of moving with said shaft in the direction of its longitudinal axis. The sealing member 16 is formed with an inner annular recess or groove 18 for the reception of an O ring 20 for sealing said member with respect to said shaft.

The housing 12 is formed with a recess or chamber 22 within which is positioned a non-rotating sealing member or ring 24 which is preferably formed from a low friction material compatible with the sealing member or ring 16. The sealing member 24 is susceptible to movement along the shaft 10 within the recess or chamber 22 of the housing and a coil spring 26 interposed between the sealing member 24 and housing 12 urges said sealing member 24 axially of said shaft and into engagement with the sealing member 16. The sealing member 24 is a non-rotating member but it is continuously biased into engagement with the rotating sealing ring 16 by means of the spring 26 so that the coacting faces or surfaces of the two sealing members will have a rubbing contact that will effectively seal the member 16 with respect to the member 24 against the leakage of any fluid there between. In order to prevent the leakage or seepage of fluid along the shaft 10 from the chamber 22 a sealing element, in the form of a bellows 28, is interposed between the housing 12 and the sealing member or ring 24. The bellows 28 has one end 30 bonded or secured by any suitable means to the sealing ring or member 24 and the other end 32 of the bellows is bonded or secured to the housing 12 within the chamber area 22. One form of securing the bellows 28 is illustrated in the various figures of the drawing wherein the sealing ring or member 24 and housing 12 are each formed with an annular ledge or projection 34 for receiving and supporting the ends 30 and 32 of the bellows 28.

While a suitable elastomeric material is preferred in fabricating the bellows 28 it can be formed from a relatively thin metal that is inherently resilient and flexible. A metallic bellows that is capable of flexing to the required degree is usually rather expensive to manufacture and is often susceptible of being fractured or broken due to fatigue and vibration in high speed operations. The bellows 28, although formed from a suitable elastomeric material, must be sufficiently thin enough to permit a ready flexing thereof during any axial movement of the sealing members 24 and 16 to insure that a rubbing sealing contact is continuously maintained between the coacting faces of the sealing members. In order to obtain the necessary degree of flexing the bellows must be thin and when formed in this manner a problem is created of having a bellows that is subject to collapsing inwardly under high pressure differences. In order to prevent such a collapse the bellows 28 is provided with an internal annular supporting disk or ring member 36 that may be secured to the inner surface of the bellows in any suitable manner, or it may be formed integrally with the bellows during its fabrication. The disk or ring member 36 will permit the bellows to flex in a free and unrestricted manner during any axial movement of the sealing members 16 and 24 yet it will insure against any radial collapsing of the bellows and at the same time permit said bellows to withstand high pressures. Thus an effective shaft seal is obtained through the use of such a bellows structure in that the coil spring 26 continuously urges sealing member 24 into a rubbing face contact with the sealing ring or member 16 while the bellows 28 provides for an effective seal between the housing 12 and the sealing member 24 during any axial movement of the shaft 10 regardless of any differences of pressure on opposite sides of the bellows or the speed of rotation of the shaft.

Figure 2:
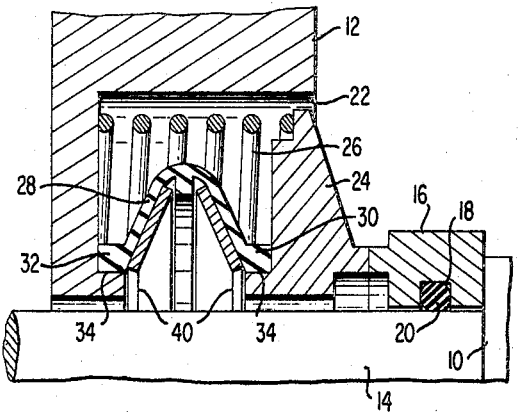
FIGURE 2 is a longitudinal sectional view through one-half of a rotary shaft seal showing a modification of the present invention.

The form of the invention shown in FIGURE 2 is the same as that shown in FIGURE 1 with the exception that the disk supporting member 36 has been replaced by a pair of disk spring members 40. The disk spring members are shown as having a conical configuration yet said members could be flat and still provide radial stiffness and strength for the bellows 28. The disk spring members 40 will resist any attempt of the bellow to collapse in an axial direction due to differences in pressure and further said members will tend to aid and abet coil spring 26 in urging and maintaining the rubbing contact face of sealing member 24 in engagement with the contact face of sealing member 16. Under certain conditions the disk spring members could be used in lieu of coil spring 26 and still maintain the rubbing faces of the sealing members in engagement and also prevent the bellows from collapsing.

Figure 3:
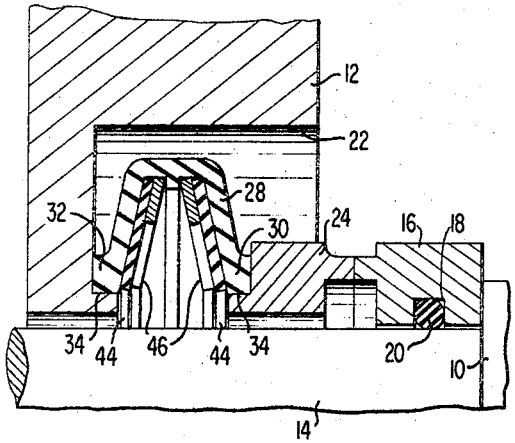
FIGURE 3 is a longitudinal sectional view through one-half of a rotary shaft seal showing a further modification of the present invention.
Figure 4:
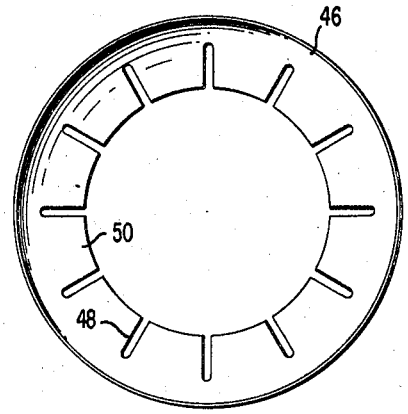
FIGURE 4 is an elevational view of a reinforcing or supporting member for use with the present invention.

The shaft seal shown in FIGURE 3 is similar to the disclosure in FIGURES 1 and 2 except that supporting plate or disk members 44 have been interposed between the bellows 28 and disk spring members 46. The supporting plate members 44 are formed of some suitable material similar to the bellows 28 but are stiffer and harder than the bellows while still being capable of flexing more than the disk spring members 40, FIGURE 3. The disk spring members 46 are similar to the disk spring members 40 and constitute the main or primary supporting means for the bellows 28. It is to be noted in FIGURE 4 that the disk spring member 46 is formed with a plurality of radial slots 48 that define finger elements 50 which provide for a greater degree of deflection than do the disk spring members 40, FIGURE 2. The slots 48 could readily be formed in the outer periphery of the member 16 rather than in the inner periphery, as shown, but with the finger elements formed in either way a high degree of flexing is obtained that results in a much greater seal movement in an axial direction than is possible with the shaft seal structure shown in either FIGURES 1 or 2. Furthermore through the use of the supporting plate or disk members 44 and the disk spring members 46 with the finger elements 50 a coil spring is not always necessary for urging and maintaining the contact face of the sealing member 24 in rubbing sealing engagement with the contact face of the sealing member 16.

Although the foregoing description is necessarily of a detailed character, in order that the invention may be completely set forth, it is to be understood that the specific terminology is not intended to be restrictive or confining and that various rearrangements of parts and modifications of detail may be resorted to without departing from the scope or spirit of the invention as herein claimed.

I claim:

1. A rotary mechanical seal assembly comprising a housing, a shaft rotatable therein, a first annular sealing face member mounted on said shaft for rotation therewith, means sealing said first annular member to said shaft, a second annular sealing face member encircling said shaft and being positioned within said housing in non-rotating relationship therewith, said annular members being in mutual face-to-face sealing contact, a bellows interposed between and secured to said housing and said second annular member for sealing said first annular member with respect to said housing, at least one annular disk spring member mounted within and carried by said bellows, said disk spring member encircling said shaft to restrain said bellows from collapsing radially while still permitting said bellows to flex.

2. A rotary mechanical seal assembly as set forth in claim 1 wherein a pair of disk spring members are positioned within said bellows around said shaft, said disk spring members being spaced axially along said shaft from one another and providing radial stiffness and strength for said bellows while being susceptible of flexing during movement of said bellows axially of said shaft.

3. A rotary mechanical seal assembly as set forth in claim 2 wherein coil spring means are interposed between said housing and second annular member for urging said second annular member into face sealing engagement with the sealing face of said first annular member.

4. A rotary mechanical seal assembly as set forth in claim 2 wherein said disk spring members are formed with a plurality of spaced slots defining finger elements, said finger elements being susceptible of deflection upon movement of said bellows axially of said shaft for supporting and strengthening said bellows against radial and axial collapse.

5. A rotary mechanical seal assembly as set forth in claim 4 wherein resilient supporting plate members are interposed between said bellows and the disk spring members for strengthening said bellows against radial and axial collapse due to high pressure within said housing.

References Cited

UNITED STATES PATENTS

| 2,294,105 | 8/1942 | Wallgren | 277—88 X |
| 2,650,117 | 8/1953 | Chambers et al. | 277—42 |
| 2,722,439 | 11/1955 | Brummer et al. | 277—42 |
| 2,753,198 | 7/1956 | Ayling | 277—42 |
| 2,984,506 | 5/1961 | Andresen et al. | 277—42 |
| 3,007,724 | 11/1961 | Amirault et al. | 277—88 X |
| 3,122,375 | 2/1964 | Greenwald | 277—88 |

FOREIGN PATENTS 601,296   5/1948   Great Britain.

JAMES KEE CHI, Primary Examiner

U.S. Cl. X.R.

277—42